June 13, 1961 L. OKNER 2,987,757
TEMPLE HINGE FOR SPECTACLE FRAMES
Filed July 18, 1960
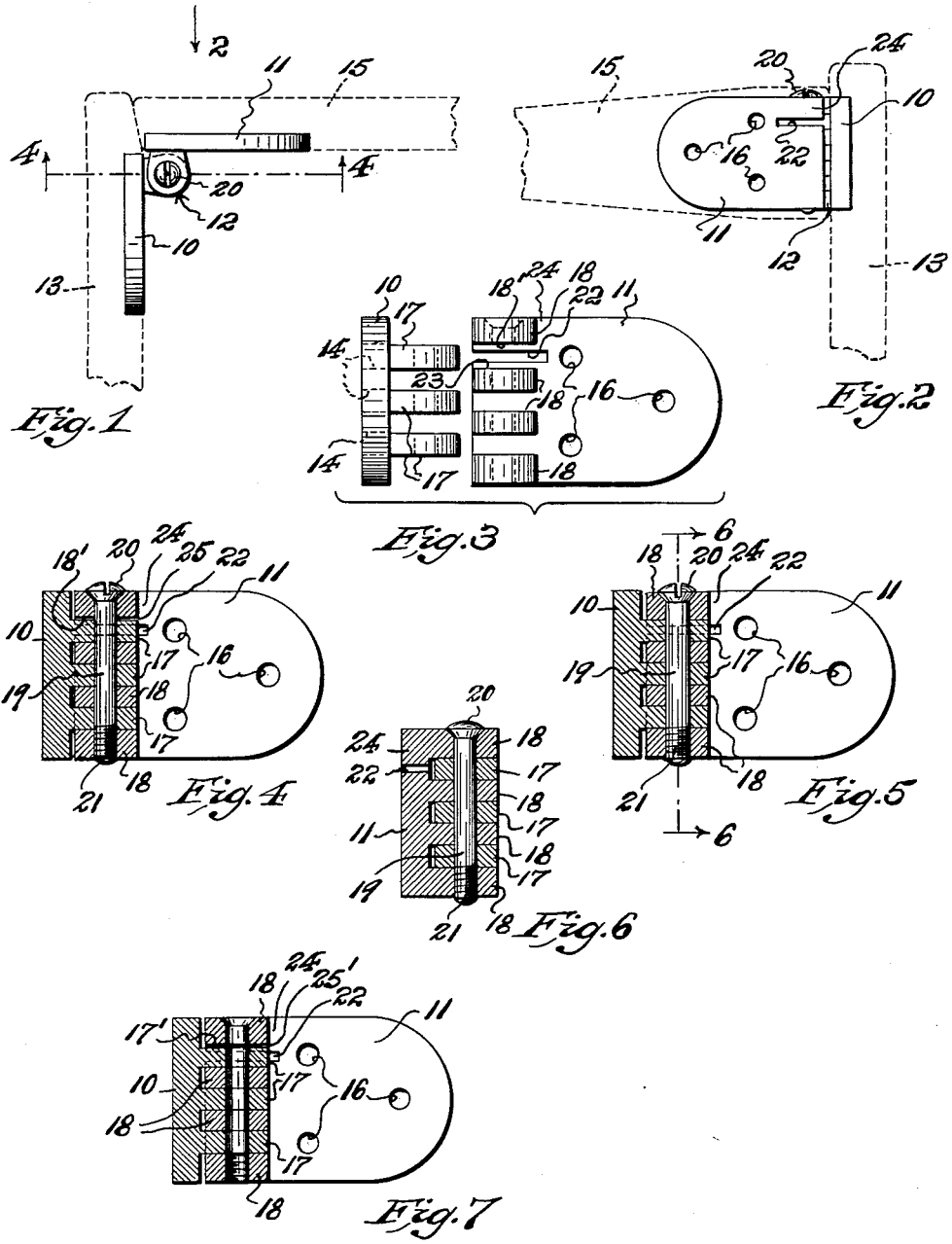
INVENTOR.
Luke Okner,
BY Richards and Cifelli,
Attorneys

United States Patent Office 2,987,757
Patented June 13, 1961

2,987,757
TEMPLE HINGE FOR SPECTACLE FRAMES
Luke Okner, Irvington, N.J., assignor to Standard Optical Mfg. Company, Livingston, N.J., a corporation of New Jersey
Filed July 18, 1960, Ser. No. 43,444
6 Claims. (Cl. 16—169)

This invention relates to improvements in a hinge structure for pivotally connecting a temple to the front or frame of eyeglasses of the spectacle type, which are formed in whole or in part from plastic material, metal, or other material.

In the use of spectacle frame structures, problems have been observed with respect to the hinging of temples to the fronts of such frame structures. These problems include the tendency of hinge pivoting screws to loosen or back out under swinging movements applied to the temples, and the difficulty of overcoming tendency of a temple to loosen so as to permit objectionable too free swaying or swinging movement thereof relative to a frame structure front.

Having these problems in view, it is an object of this invention to provide a novel hinge structure which effectively overcomes either tendency of the hinge pivoting screw to loosen or the connection of a temple to the frame front to become (either through wear of interengaged elements of the hinge or by loosening of the pivot screw) so loose that objectionable too free swaying or swinging of the temple relative to the frame front occurs.

The above and other objects of this invention, not at this time more particularly mentioned, will be understood from a reading of the following description of illustrative embodiments of this invention in connection with accompanying drawings thereof, in which:

FIG. 1 is a top edge view of a hinge structure according to this invention as operatively applied between a temple and the front of a spectacle frame, the latter parts being fragmentarily shown in phantom by broken lines; and FIG. 2 is a side elevational view of the same, viewed in the direction of arrow 2 in FIG. 1.

FIG. 3 is an inside elevational view of the leaves of the hinge structure separated but juxtaposed ready to be assembled and pivotally joined by a pivot screw (not shown), this view being drawn on an enlarged scale.

FIG. 4 is an inside elevational view, in part section, similar to that of FIG. 3, but showing the hinge leaves assembled and pivotally joined by a pivot screw, the latter not yet being tightened home; FIG. 5 is a similar view, showing the pivot screw tightened home; and FIG. 6 is a vertical sectional view, taken on line 6—6 in FIG. 5.

FIG. 7 is a view similar to that of FIG. 4, but showing a modified form of the hinge structure.

Similar characters of reference are employed in the above described views to indicate corresponding parts.

Referring to the drawings, the hinge structure, according to the present invention, comprises a pair of hinge leaves or plates 10 and 11 adapted to be pivotally joined together by an intermediate hinge barrel 12. One of the hinge leaves or plates, e.g. leaf or plate 10, is adapted to be affixed to the back of an end portion of the front 13 of a spectacle frame, as by rivets (not shown), which engage through openings 14 with which said leaf or plate 10 is provided. The other of the hinge leaves or plates, e.g. the leaf or plate 11, is adapted to be affixed to the inside of an inner portion of a temple 15 of the spectacle frame, also by rivets (not shown), which engage through openings 16 with which said leaf or plate 11 is provided.

The hinge barrel 12 of the hinge structure is thus positioned to pivotally connect the temple 15 to the front 13 of a spectacle frame, as indicated in FIGS. 1 and 2 of the drawings.

The hinge barrel 12 comprises one or more spaced apart perforate knuckle ears 17 which are integrally formed in connection with one leaf or plate of the hinge structure, e.g. the frame leaf or plate 10, to project therefrom in horizontal plane at a right angle to the perpendicular plane of said leaf or plate; and a plurality of spaced apart perforate knuckle ears 18 which are integrally formed in connection with the other leaf or plate of the hinge structure, e.g. the temple leaf or plate 11, to project therefrom in horizontal plane at a right angle to the perpendicular plane thereof. These knuckle ears are so relatively positioned and spaced apart that the knuckle ears 17 of the frame hinge leaf or plate 10 will dovetail into the gaps between the knuckle ears 18 of the temple hinge leaf or plate 11, when said knuckle ears are operatively assembled in hinge barrel forming relation. When the knuckle ears 17—18 are thus assembled in hinge barrel forming relation, a pivot screw 19 is passed, preferably downwardly, through the aligned knuckle ears, thus pivotally joining the hinge leaves or plates one to the other. The pivot screw is provided with an enlarged head 20 to engage, preferably, the upper end portion of the hinge barrel. As shown, the hinge barrel comprises seven knuckle ears 17—18, but the same may comprise a lesser number thereof, e.g. three or five, or a greater number according to the size and form of hinge structure desired to be provided in any given case.

In order to retain the pivot screw 19 in place, the perforation of an outermost, preferably the lower most or bottom external knuckle ear 18, is internally screwthreaded, whereby to be engaged by the external screwthreads 21 with which the pivot screw 19 is provided.

One of the hinge leaves or plates of the hinge structure, preferably the temple hinge leaf or plate 11 as shown, is provided with a longitudinally disposed open end slot 22 which enters its inner or hinged end so as to intersect a gap 23 between knuckle ears of said leaf or plate, which is adapted to receive a knuckle or ear of the other hinge leaf or plate. This slot is of substantial length so as to terminate inwardly somewhat beyond the hingle barrel 12. The slot 22 provides the hinge leaf or plate with a tensionally yieldable section or tongue 24 in the plane thereof and between the slot and an outer marginal edge of the hinge leaf or plate. This yieldable section or tongue 24 carries a knuckle ear of the hinge leaf or plate.

The slot 22 can be provided in either the temple hinge leaf or plate 11 or the frame hinge leaf or plate 10, and preferably between knuckle ears of the leaf or plate at the top end of the hinge barrel 12, although it could be provided between any other two knuckle ears of the hinge leaf or plate in which it is formed.

As shown in connection with the temple hinge leaf or plate 11, the yieldable section or tongue 24, as defined by the slot 22, carries an outer or top knuckle ear 18 which is spaced by the gap 23 from a next adjacent knuckle ear 18. To allow inward yielding movement of the section or tongue 24, the underside 18' of said outer or top knuckle ear is cut or trimmed away so as to somewhat reduce the thickness thereof, whereby when a knuckle ear 17 of the front hinge leaf or plate 10 is entered in the gap 23, during assembly of the hinge barrel 12, a space 25 will be initially left between said outer or top knuckle ear 18 and the knuckle ear 17 entered in said gap (see FIG. 4).

Due to the provision of the tensionally yieldable section or tongue 24, when the pivot screw 19 is entered through the hinge barrel and threaded into the opposite outer or bottom knuckle ear 18 of the hinge barrel, and then tightened home, the head 20 of the pivot screw engages and exerts inward or downward thrust upon the yieldable section or tongue 24, thus operating to downwardly or inwardly deflect said section or tongue 24, thereby putting the same in a condition of springy tension and closing the space 25. This induced tension of the section or tongue 24 causes the same to exert an up-pushing thrust against the pivot screw head 20. The tension of the section or tongue 24 also exerts an upward axial drag upon the pivot screw 19. The tensional thrust of the section or tongue 24 produces two desirable effects. First, it tends to tighten contact of the knuckle ears of the hinge barrel one with another, whereby to prevent relative looseness, while at the same time compensating for wear between said knuckle ears, which, if not compensated, would result in looseness and consequent objectionable too free swinging of a temple relative to the front of a spectacle frame; and second, the upthrust exerted against the head 20 of the pivot screw 19 by the tensioned section or tongue 24, and the accompanying axial drag imparted to the pivot screw 19, produces a strong frictional engagement between the threads of the pivot screw and the internal screw threads of the bottom knuckle ear of the hinge barrel, so that strong resistance to backing out movement or loosening of the pivot screw relative to the hingle barrel is attained. Preferably, the head 20 of the pivot screw 19 is of inverted conical formation adapted to countersink in a conforming conical seat with which the outer or top knuckle ear 18 of the hinge barrel is provided for its reception, thus providing a substantial area of meeting surface contact of said screw head 20 with the knuckle ear, to enhance frictional resistance to loosening of the pivot screw 19 after it is turned home to tightened condition.

An alternative to the above described method of forming the space 25 to provide for tensional play of the section or tongue 24 under the thrust of the tightened home pivot screw 19, instead of cutting or trimming away the underside of the outer or top knuckle ear 18, or any other knuckle ear 18 bounding a gap 23 intersected by the slot 22 of the temple hinge leaf or plate 11, the upper side 17' of a hinge knuckle 17, disposed to enter a gap 23 when assembling the hinge barrel 12, can be cut or trimmed away to form an equivalent space 25'. This is shown in FIG. 7.

Other modifications of the hinge structure adapted to attain the purposes of this invention can be made within the scope of the appended claims.

From the above it will now be apparent that the novel hinge structure according to this invention provides an effective means for avoiding objectionable loosening of the pivoting screw of a hinging connection between a temple and front of a spectacle frame, while, at the same time, compensating for loosening wear, which may occur between the knuckle ears of the hinge barrel.

Having now described my invention, I claim:

1. A hinge structure for interposition between the front of a spectacle frame and a temple thereof, whereby to pivotally join the latter to the former, comprising a pair of hinge leaves joined by a hinge barrel formed by interengaged perforate knuckle ears which project from the hinge leaves, a headed pivot screw extending through said hinge barrel into threaded engagement with an outer knuckle ear thereof, and one of the hinge leaves having an indenting slot intermediate knuckle ears thereof whereby to provide the same with a tensionally yieldable section disposed in the plane thereof and by which a knuckle ear of the hinge barrel is carried for projection therefrom, said yieldable section being adapted, when the pivot screw is turned home in the hinge barrel, to be flexed so as to exert tensional axial pressure upon said screw, whereby to induce frictional resistance to loosening of the screw while at the same time maintaining the knuckle ears of the hinge barrel in tight mutual contact one with another.

2. A hinge structure for interposition between the front of a spectacle frame and a temple thereof, whereby to pivotally join the latter to the former, comprising a pair of hinge leaves joined by a hinge barrel formed by interengaged perforate knuckle ears which project from the hinge leaves, a headed pivot screw extending through said hinge barrel into threaded engagement with an outer knuckle ear thereof, one of said hinge leaves having a longitudinal slot indenting its inner end portion so as to intersect a gap between adjacent knuckle ears thereof, which gap receives a knuckle ear of the other hinge leaf and is wider than the thickness of the latter knuckle ear, thus providing the first mentioned hinge leaf with a tensionally yieldable section disposed in the plane thereof and by which a knuckle ear of the hinge barrel is carried for projection therefrom, said yieldable section being adapted, when the pivot screw is turned home in the hinge barrel, to exert tensional axial pressure upon said screw, whereby to induce frictional resistance to loosening of said screw, while at the same time maintaining the knuckle ears of the hinge barrel in tight mutual contact one with another.

3. A hinge structure for interposition between the front of a spectacle frame and a temple thereof, whereby to pivotally join the latter to the former, comprising a front attached hinge leaf and a temple attached hinge leaf joined by a hinge barrel formed by interengaged perforate knuckle ears which project therefrom, outer knuckle ears of said hinge barrel being carried by said temple hinge leaf, a headed pivot screw extending through said hinge barrel into threaded engagement with one of said outer knuckle ears, and said temple hinge leaf having a slot indenting its inner end portion to provide the same with a tensionally yieldable section disposed in the plane thereof and by which the opposite outer knuckle ear is carried whereby to be engaged by the head of the pivot screw, said yieldable section being adapted, when the pivot screw is turned home in the hinge barrel, to exert tensional axial pressure upon said screw, whereby to induce frictional resistance to loosening of the screw, while at the same time maintaining the knuckle ears of the hinge barrel in tight mutual contact one with another.

4. A hinge structure according to claim 3 wherein the pivot screw head is of inverted conical formation, and the knuckle ear engaged thereby is provided with a conforming conical seat to receive said screw head.

5. A hinge structure for interposition between the front of a spectacle frame and a temple thereof, whereby to pivotally join the latter to the former, comprising a front attached hinge leaf and a temple attached hinge leaf joined by a hinge barrel formed by interengaged perforate knuckle ears which project therefrom, outer knuckle ears of said hinge barrel being carried by said temple hinge leaf, a headed pivot screw extending through said hinge barrel into threaded engagement with one of said outer knuckle ears, the head of said screw being adapted to engage the opposite outer knuckle ear, said temple hinge leaf having a longitudinal slot indenting its hinged end so as to intersect a gap between said opposite outer knuckle ear and an adjacent knuckle ear thereof, which gap receives a knuckle ear of the front hinge leaf and is wider than the thickness of the latter, thus providing the temple hinge leaf with a tensionally yieldable section disposed in the plane thereof and by which said opposite outer knuckle ear is carried for projection therefrom, said yieldable section being adapted, when the pivot screw is turned home in the hinge barrel, to exert tensional axial pressure upon said screw, whereby to induce frictional resistance to loosening of said screw, while at the same time maintaining the knuckle ears of the hinge barrel in tight mutual contact one with another.

6. A hinge structure according to claim 5, wherein the pivot screw head is of inverted conical formation, and said knuckle ear engaged thereby is provided with a conforming conical seat to receive said screw head.

References Cited in the file of this patent

UNITED STATES PATENTS

| | | |
|---|---|---|
| 367,552 | Scheidig | Aug. 2, 1887 |
| 974,682 | Lester et al. | Nov. 1, 1910 |
| 1,234,887 | Emory | July 31, 1917 |
| 1,588,807 | Powell et al. | June 15, 1926 |